United States Patent
Ohtsuka

(10) Patent No.: US 9,277,301 B2
(45) Date of Patent: Mar. 1, 2016

(54) OPTICAL UNIT AND OPTICAL DEVICE

(71) Applicant: Sumitomo Electric Industries, Ltd., Osaka-shi (JP)

(72) Inventor: Takafumi Ohtsuka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/508,757

(22) Filed: Oct. 7, 2014

(65) Prior Publication Data

US 2015/0098701 A1    Apr. 9, 2015

(30) Foreign Application Priority Data

Oct. 8, 2013  (JP) ................................ 2013-211170

(51) Int. Cl.
*H04Q 11/00* (2006.01)
*H04B 10/50* (2013.01)
*H04B 10/516* (2013.01)

(52) U.S. Cl.
CPC ......... *H04Q 11/0005* (2013.01); *H04B 10/506* (2013.01); *H04B 10/516* (2013.01)

(58) Field of Classification Search
CPC .............. H04Q 2011/0007; H04Q 2011/0022; H04Q 2011/0024; H04Q 2011/0026; H04Q 2011/0005; H04B 10/506; H04B 10/516
USPC .................... 398/49, 55, 82, 87, 88, 138, 164
See application file for complete search history.

(56) References Cited

U.S. PATENT DOCUMENTS

| | | | |
|---|---|---|---|
| 2004/0156581 A1 | 8/2004 | Golub et al. | |
| 2007/0160321 A1* | 7/2007 | Wu | G02B 6/12021 385/24 |
| 2010/0091804 A1* | 4/2010 | Musio | H01S 5/141 372/20 |
| 2011/0217037 A1* | 9/2011 | Yoshida | H04J 14/02 398/48 |
| 2013/0064512 A1* | 3/2013 | Ghantiwala | H01S 5/02469 385/92 |
| 2014/0037288 A1* | 2/2014 | Matsumoto | H04J 14/02 398/48 |

FOREIGN PATENT DOCUMENTS

| | | |
|---|---|---|
| JP | 2008-089904 A | 4/2008 |
| JP | 2009-145887 A | 7/2009 |
| JP | 2012-168287 A | 9/2012 |
| JP | 2012-215774 A | 11/2012 |

* cited by examiner

*Primary Examiner* — Dalzid Singh
(74) *Attorney, Agent, or Firm* — Venable LLP; Michael A. Sartori

(57) ABSTRACT

A signal processing element that modulates beam from an input/output unit, an optical substrate mounting the signal processing element, and a temperature controller that controls a temperature of the signal processing element are included, the signal processing element includes an incidence surface on which the beam is incident, a modulation layer that modulates the beam from the incidence surface, and a driving substrate for controlling the modulation of the beam arranged on the opposite side of the incidence surface, the temperature controller is arranged opposite the driving substrate, the incidence surface is connected to the optical substrate by a first connection portion, the driving substrate is connected to the temperature controller by a second connection portion, and an area on the temperature controller side of the second connection portion is more greatly deformed than that on the driving substrate side according to change in volume of the temperature controller.

12 Claims, 5 Drawing Sheets

(a)

(b)

ically transparent plate, an optional system
OPTICAL UNIT AND OPTICAL DEVICE

BACKGROUND OF THE INVENTION

1. Field of the Invention

One aspect of the present invention relates to an optical unit and an optical device.

2. Related Background Art

A wavelength selective switch is described in Japanese Patent Laid-Open Publication No, 2012-168287. This wavelength selective switch includes a housing that is partially formed of an optically transparent plate, an optical system mounted on one surface of the plate, and a deflection unit mounted on the other surface of the plate. The optical system includes an input port that inputs a wavelength multiplexed signal, a dispersion unit that disperses a beam from the input port into wavelength signals, and a condensing element that condenses the wavelength signals. The deflection unit deflects the wavelength signal and couples the wavelength signals to output ports. The deflection unit is an MEMS mirror array or an LCOS.

SUMMARY OF THE INVENTION

In the wavelength selective switch described above, when a liquid crystal element such as an LCOS is used as a deflection unit, it can be considered that a temperature of the deflection unit is set high using a temperature controller such as a heater for improvement of response speed. However, the deflection unit may be damaged and optical characteristics may deteriorate as a result of change in volume of the temperature controller due to temperature change and deformation of the deflection unit due to stress applied thereto. Further, when the plate is deformed with the deformation of the deflection unit, a relative positional relationship of the optical system mounted on the plate may be changed and the optical characteristics may deteriorate.

An optical unit according to an aspect of the present invention includes an input/output unit; a signal processing element modulating a beam input from the input/output unit; an optical system optically coupling the input/output unit and the signal processing element; an optical substrate mounting the input/output unit, the optical system, and the signal processing element; and a temperature controller controlling a temperature of the signal processing element, wherein the signal processing element includes an incidence surface on which the beam input from the input/output unit is incident, a modulation layer modulating the beam incident from the incidence surface, and a driving substrate for controlling the modulation of the beam arranged on the opposite side of the incidence surface in the modulation layer, the temperature controller is arranged opposite the driving substrate, the incidence surface is connected to the optical substrate by a first connection portion, the driving substrate is connected to the temperature controller by a second connection portion, and the second connection portion thermally connects the driving substrate and the temperature controller so that an area on the temperature controller side of the second connection portion to be more greatly deformed than an area on the driving substrate side of the second connection portion according to change in volume of the temperature controller.

DETAILED DESCRIPTION OF THE EMBODIMENTS

[Description of the Embodiments]

Figure 1:
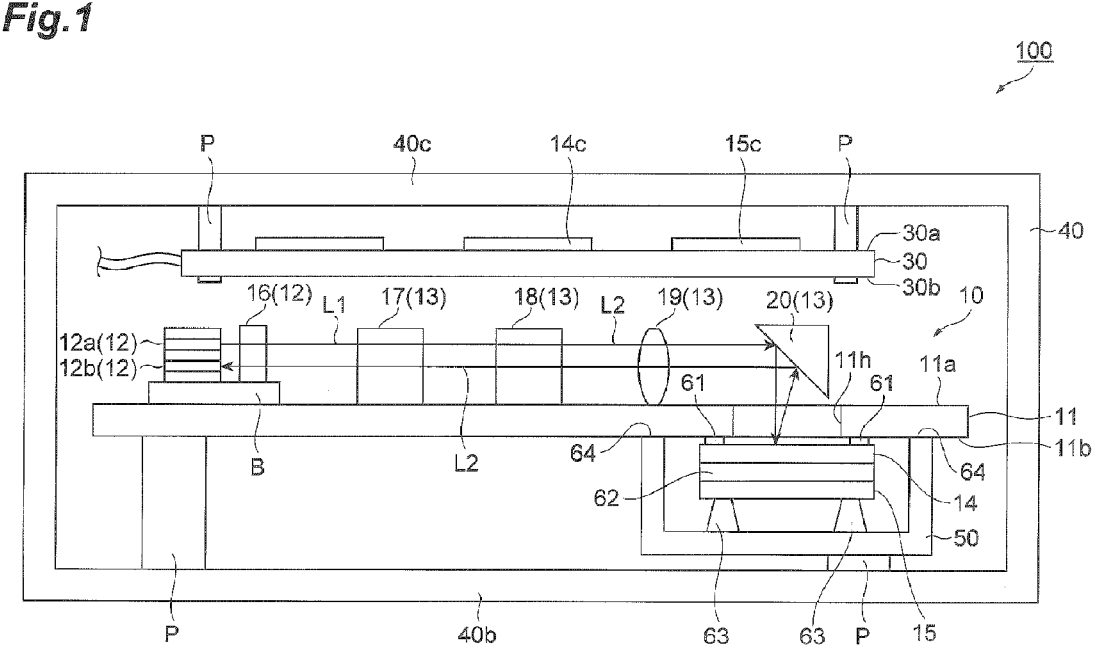
FIG. 1 is a schematic cross-sectional view of an optical device according to the present embodiment.

First, an embodiment of an optical unit and an optical device according to one aspect of the present invention will be listed and described.

An optical unit according to one embodiment includes an input/output unit; a signal processing element modulating a beam input from the input/output unit; an optical system optically coupling the input/output unit and the signal processing element; an optical substrate mounting the input/output unit, the optical system, and the signal processing element; and a temperature controller controlling a temperature of the signal processing element, wherein the signal processing element includes an incidence surface on which the beam input from the input/output unit is incident, a modulation layer modulating the beam incident from the incidence surface, and a driving substrate for controlling the modulation of the beam arranged on the opposite side of the incidence surface in the modulation layer, the temperature controller is arranged opposite the driving substrate, the incidence surface is connected to the optical substrate by a first connection portion, the driving substrate is connected to the temperature controller by a second connection portion, and the second connection portion thermally connects the driving substrate and the temperature controller so that an area on the temperature controller side of the second connection portion to be more greatly deformed than an area on the driving substrate side of the second connection portion according to change in volume of the temperature controller.

In this optical unit, response speed may be improved by controlling the temperature of the signal processing element from the driving substrate side using the temperature controller. Particularly, when the temperature of the signal processing element is controlled from the driving substrate side using the temperature controller, deformation of the signal processing element caused by stress applied due to change in volume of the temperature controller is suppressed. Further, deformation of the optical substrate with the deformation of the signal processing element is suppressed. Thus, according to this optical unit, deterioration of optical characteristics may be suppressed.

In the optical unit according to one embodiment, a deformation amount of the second connection portion against predetermined stress may be larger than a deformation amount of the first connection portion against the predetermined stress. In this case, the second connection portion is more easily deformed than the first connection portion. Therefore, the stress due to change in volume of the temperature controller is reliably buffered by the deformation of the second connection portion. Thus, deterioration of the optical characteristics with the deformation of the first connection portion is suppressed.

The optical unit according to one embodiment may further include a cover covering the signal processing element and the temperature controller, the temperature controller may be connected to the cover by a third connection portion, the cover may be connected to the optical substrate by a fourth connection portion, and the third connection portion may be arranged opposite the side the second connection portion is provided in the temperature controller. In this case, the stress due to change in volume of the temperature controller may also be buffered on the opposite side of the signal processing element.

In the optical unit according to one embodiment, thermal conductivity of the second connection portion may be higher than thermal conductivity of the third connection portion. In this case, since heat generated in the temperature controller is easily transferred to the second connection portion, it may be suppressed that the heat transfer to the cover through the third connection portion. Therefore, deformation of the cover due to the heat from the temperature controller or deformation of the optical substrate with the deformation of the cover is suppressed.

In the optical unit according to one embodiment, a deformation amount of the third connection portion against the predetermined stress may be larger than a deformation amount of the fourth connection portion against the predetermined stress. In this case, the third connection portion is more easily deformed than the fourth connection portion. Therefore, since the stress due to change in volume of the temperature controller is buffered by the deformation of the third connection portion, transfer to the optical substrate through the cover and the fourth connection portion is suppressed.

In the optical unit according to one embodiment, a deformation amount of the first connection portion against the predetermined stress may be larger than a deformation amount of the fourth connection portion against the predetermined stress. In this case, the fourth connection portion is not as easily deformed as the first connection portion. Therefore, using the cover connected to the optical substrate by the fourth connection portion that is less easily deformed, the signal processing element may be reliably supported against the optical substrate by using the cover connected to the optical substrate by the fourth connection portion that is less easily deformed.

In the optical unit according to one embodiment, the input/output unit and the optical system may be mounted on a first surface of the optical substrate, and the signal processing element may be mounted on a second surface different from the first surface of the optical substrate. In this case, the temperature controller may be arranged opposite the driving substrate of the signal processing element without interrupting an optical path.

In the optical unit according to one embodiment, a hole opening in the second surface may be formed in the optical substrate, and the signal processing element may be arranged to face the hole and optically coupled to the input/output unit via the optical system and the hole. In this case, the temperature controller is easily arranged without interrupting the optical path.

The optical unit according to one embodiment may further include: a first housing sealing the input/output unit, the optical system, and the signal processing element, wherein the cover and the fourth connection portion constitute a portion of the first housing. In this case, since a portion of the first housing covers the signal processing element and the temperature controller, the optical unit may be downsized.

In the optical unit according to one embodiment, a linear expansion coefficient of the optical substrate may be $1 \times 10^{-6}$/deg ° C. or less. In this case, a difference between a linear expansion coefficient of the optical substrate and a linear expansion coefficient of a temperature controller increases. Therefore, deformation of the optical substrate due to the stress caused by change in volume of the temperature controller may be suppressed.

In the optical unit according to one embodiment, the optical system may include an anamorphic system converting a shape of the beam input from the input/output unit into an elliptical shape; a wavelength dispersive element dispersing the beam into wavelength components; and a condensing element coupling the wavelength components to the signal processing element. In this case, since the optical path in the optical system is long, and the deterioration of optical characteristics due to the deformation of the optical substrate becomes remarkable, suppression of the deformation of the optical substrate as described above is particularly effective.

The optical device according to one embodiment includes the optical unit; an electrical substrate including a first control system controlling the signal processing element and a second control system controlling the temperature controller; and a second housing accommodating the optical unit and the electrical substrate. Since this optical device includes the optical unit described above, deterioration of optical characteristics may be suppressed.

[Details of Embodiments]

Hereinafter, embodiments of the present invention will be described in detail with reference to the accompanying drawings. Further, the same elements are denoted with the same signs in description of the drawings and repeated description is omitted. One aspect of the present invention is not limited to the following illustrations. One aspect of the present invention is shown by each claim, and all changes with equivalent meanings and scope to each claim are intended to be included.

Figure 2:
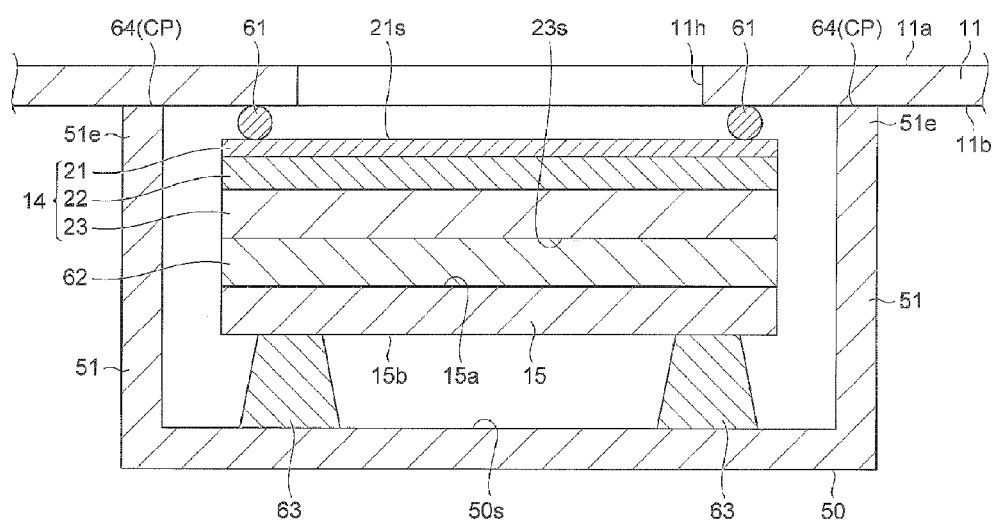
FIG. 2 is a schematic enlarged cross-sectional view of the optical device illustrated in FIG. 1.

FIG. 1 is a schematic cross-sectional view of an optical device according to the present embodiment. FIG. 2 is an enlarged cross-sectional view of the optical device illustrated in FIG. 1. An optical device 100 (and an optical unit 10) illustrated in FIGS. 1 and 2 is, for example, a wavelength selective switch. The optical device 100 includes the optical unit 10, an electrical substrate 30, and a housing (a second housing) 40 that accommodates the optical unit 10 and the electrical substrate 30. The optical unit 10 includes an optical substrate 11, an input/output unit 12, an optical system 13, a signal processing element 14, and a temperature controller 15.

The optical substrate 11 includes a main surface (a first surface) 11a, and a rear surface (a second surface different from the first surface) 11b on the opposite side of the main surface 11a. A through hole (a hole) 11h through the main surface 11a and the rear surface 11b is formed in the optical substrate 11. The through hole 11h is opened in the main surface 11a and the rear surface 11b. The optical substrate 11 is formed by a material having a small linear expansion coefficient (for example, an invar or a super invar). The linear expansion coefficient of the optical substrate 11 is, for example, $1 \times 10^{-6}$/deg ° C. or less. The optical substrate 11, for example, is fixed to a bottom portion 40b of the housing 40 by support members P in plural positions of the rear surface 11b.

The input/output unit 12 is mounted on the main surface 11a of the optical substrate 11 through a base B. The input/output unit 12, for example, includes one input port 12a, a plurality of output ports 12b, and a collimator array 16. The input port 12a and the output ports 12b are optically coupled to the collimator array 16. The input port 12a and the output ports 12b are arranged in a direction perpendicular to the main surface 11a of the optical substrate 11. The input port 12a inputs a beam L1 which is a wavelength multiplexed signal. The output port 12b outputs a beam L2 which is a wavelength component. The input port 12a and the output ports 12b include, for example, an optical fiber.

The optical system 13 is mounted on the main surface 11a of the optical substrate 11. The optical system 13 includes an anamorphic system 17, a wavelength dispersive element 18, a condensing element 19, and a folding mirror 20. The anamorphic system 17 converts a shape of the beam L1 into an elliptical shape. More specifically, the anamorphic system 17 expands a diameter of the beam L1 in a direction parallel to the main surface 11a of the optical substrate 11. The anamorphic system 17 includes, for example, a plurality of prisms.

The wavelength dispersive element 18 disperses the beam L1 which is the wavelength multiplexed signal into the beam L2 which is a wavelength component. More specifically, the wavelength dispersive element 18 disperses the beam L1 in a direction that is parallel to the main surface 11a of the optical substrate 11. The wavelength dispersive element 18 includes, for example, a transmissive diffraction grating.

The condensing element 19 couples the beam L2 which is the wavelength component to the signal processing element 14. More specifically, the condensing element 19 condenses the beam L2 on the signal processing element 14 through the folding mirror 20. The condensing element 19 is, for example, a spherical lens. The folding mirror 20 is arranged on the through hole 11h of the optical substrate 11 and reflects the beam L2 toward the optical substrate 11 (the signal processing element 14). Thus, the optical system 13 optically couples the input/output unit 12 and the signal processing element 14 to each other using the respective elements described above.

The signal processing element 14 is mounted on the rear surface 11b of the optical substrate 11. The signal processing element 14 modulates the beam L2. More specifically, the signal processing element 14 includes a cover glass (incidence surface) 21, a modulation layer 22, and a driving substrate 23. The signal processing element 14 is arranged on the rear surface 11b of the optical substrate 11 so that the cover glass 21 faces the through hole 11h of the optical substrate 11. Therefore, the signal processing element 14 is optically coupled to the input/output unit 12 via the optical system 13 and the through hole 11h.

The beam L2 is incident on the cover glass 21. The modulation layer 22 modulates the beam L2. The driving substrate 23 is arranged in a position on the opposite side of the cover glass 21. In other words, the driving substrate 23 is opposite the cover glass 21 through the modulation layer 22. The driving substrate 23 controls modulation (for example, phase modulation or intensity modulation) of the beam in the modulation layer 22. The driving substrate 23 supports the modulation layer 22. The signal processing element 14 is, for example, an LCOS.

Figure 3:
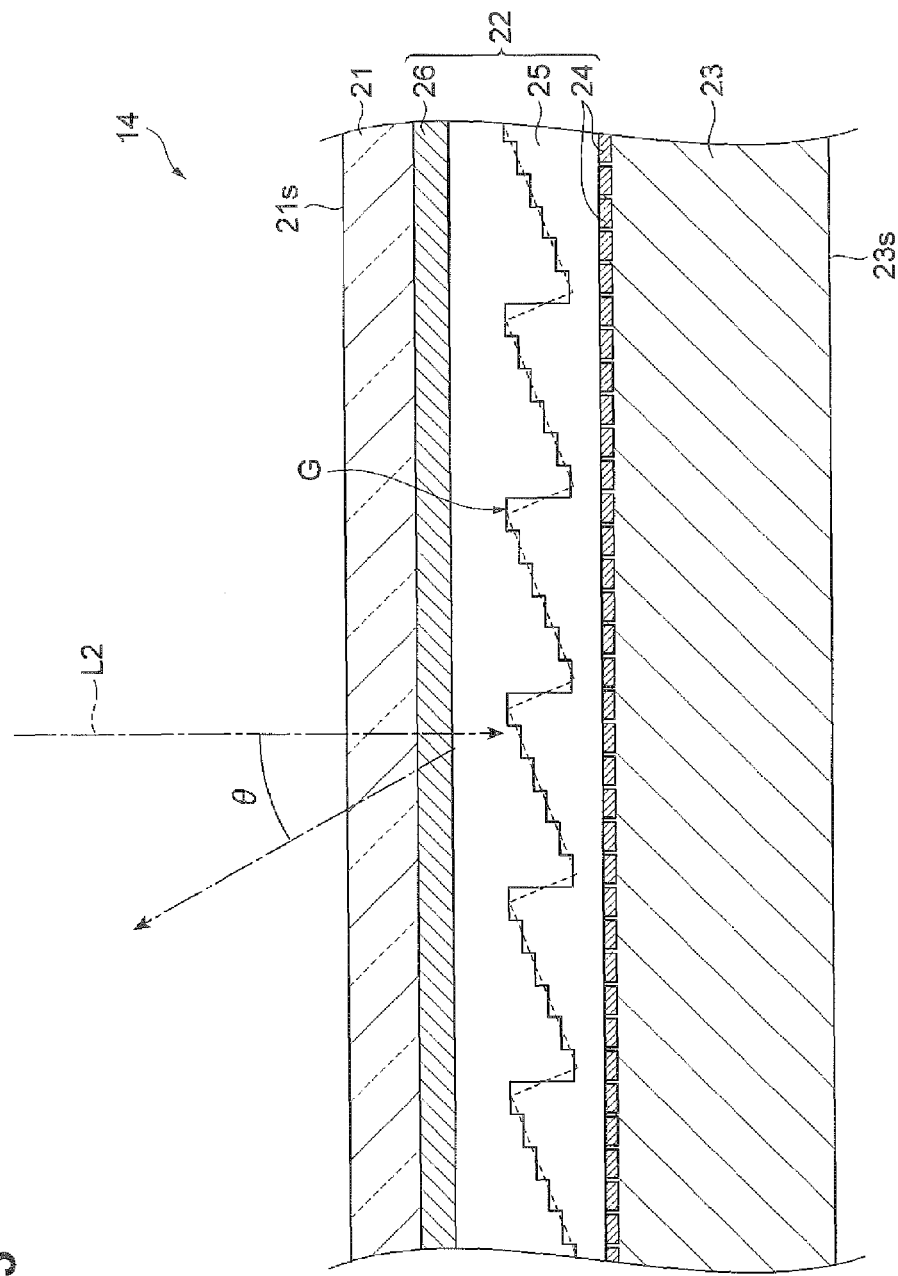
FIG. 3 is a schematic cross-sectional view illustrating an example of a signal processing element including an LCOS.

FIG. 3 is a cross-sectional view illustrating an example of the signal processing element which is the LCOS. The modulation layer 22 includes a plurality of pixel electrodes 24, a liquid crystal layer 25, and a transparent electrode 26. The pixel electrodes 24, the liquid crystal layer 25, and the transparent electrode 26 are sequentially arranged from the driving substrate 23 to the cover glass 21. The pixel electrodes 24 are arranged in a two-dimensional form along a main surface of the driving substrate 23.

The beam L2 is incident on the liquid crystal layer 25 through the cover glass 21. Also, a phase of the beam L2 is modulated according to an amount of an electric field formed between the transparent electrode 26 and the plurality of pixel electrodes 24. An electric field having a different amount is formed in each pixel electrode 24, and thus an amount of phase modulation differs in each pixel. The driving substrate 23 controls the amount of phase modulation by controlling a voltage applied to the liquid crystal layer 25. Further, in FIG. 3, the amount of phase modulation in each pixel when a phase modulation pattern in a diffraction grating shape is presented to the modulation layer 22 is conceptually illustrated as a graph G.

In the modulation layer 22, when the phase modulation amount increases from 0 (rad) to $2\pi$ (rad) stepwise and reaches $2\pi$ (rad), the phase modulation amount returns to 0 (rad) again and increases from 0 (rad) to $2\pi$ (rad) stepwise. By such a phase modulation pattern, a phase modulation pattern in a diffraction grating shape showing stepwise monotonic increase is realized. Also, when the beam L2 is incident on the modulation layer 22 with such a phase modulation pattern, the beam L2 is reflected at an emission angle $\theta$ according to a period of the diffraction grating. That is, the signal processing element 14 is an optical deflection element that diffractively deflects the beam input from the input port 12a toward the output port 12b. The beam L2 deflected by the signal processing element 14 is output from the output port 12b through the optical system 13, as illustrated in FIGS. 1 and 2.

FIGS. 1 and 2 are referred to again. The temperature controller 15 controls a temperature of the signal processing element 14. The temperature controller 15 has a flat plate shape and is arranged opposite the driving substrate 23. The temperature controller 15 is, for example, a heater. The temperature controller 15 sets the temperature of the modulation layer 22 (particularly, the liquid crystal layer 25) to a high temperature of about 50° C.

Therefore, the optical unit 10 further includes a temperature sensor (not illustrated) that measures the temperature of the modulation layer 22 (particularly, the liquid crystal layer 25). The control unit (a second control system) 15c controls an amount of heat generation of the temperature controller 15 so as to set the temperature of the temperature controller 15 based on a temperature measurement result of the temperature sensor. The temperature sensor is a thermocouple provided near the liquid crystal layer 25. The optical unit 10 further includes a cover 50 in a rectangular box shape that covers the signal processing element 14 and the temperature controller 15.

The electrical substrate 30 includes a main surface 30a, and a rear surface 30b on the opposite side of the main surface 30a. The rear surface 30b is a surface that is opposite the main surface 11a of the optical substrate 11. The electrical substrate 30 is fixed to an upper portion 40c of the housing 40 in plural positions by support members P. A control unit (first control system) 14c for controlling the signal processing element 14, and a control unit 15c for controlling the temperature controller 15 are provided on the main surface 30a of the electrical substrate 30. The signal processing element 14 and the temperature controller 15 are electrically connected to the control unit 14c and the control unit 15c, respectively, by signal lines, which are not illustrated.

The housing 40 seals the optical unit 10 and the electrical substrate 30. That is, the optical unit 10 including the input/output unit 12, the optical system 13, the signal processing element 14, and the temperature controller 15, and the electrical substrate 30 on which the control unit 14c and the control unit 15c are provided are all sealed by the housing 40.

The signal processing element 14 is arranged between the optical substrate 11 and the temperature controller 15, and is connected to each of the optical substrate 11 and the temperature controller 15. Connection portions (first connection portions) 61 are arranged between the optical substrate 11 and the signal processing element 14, and connection portions (second connection portions) 62 are arranged between the signal processing element 14 and the temperature controller 15. Also, the cover glass 21 of the signal processing element 14 is connected to the rear surface 11b of the optical substrate 11 by the connection portions 61, and the driving substrate 23 of the signal processing element 14 is connected to the temperature controller 15 by the connection portions 62.

A plurality of the connection portions 61 are arranged at intervals along an outer edge of the through hole 11h of the optical substrate 11 between the rear surface 11b of the optical substrate 11 and a surface (a surface on the opposite side of the modulation layer 22) 21s of the cover glass 21. As the connection portions 61 are bonded to both the surface 21s of the cover glass 21 and the rear surface 11b of the optical substrate 11, the optical substrate 11 and the cover glass 21 are fixed to each other. The connection portions 61 are, for example, an adhesive including an epoxy based resin. Further, the connection portions 61 may be provided without an interval along the outer edge of the through hole 11h.

The connection portion 62 is arranged over an area between a rear surface (a surface on the opposite side of the modulation layer 22) 23s of the driving substrate 23 and a surface (a surface on the signal processing element 14 side) 15a of the temperature controller 15. As the connection portion 62 is bonded to both the rear surface 23s of the driving substrate 23 and the surface 15a of the temperature controller 15, the driving substrate 23 and the temperature controller 15 are fixed to each other. The connection portion 62 is, for example, a thermally conductive porous body such as metal wool, or a thermally conductive gel. That is, the connection portion 62 thermally connects the driving substrate 23 and the temperature controller 15. When the connection portion 62 is the porous body, the porous body can be impregnated with a predetermined adhesive to have an adhesive property.

Figure 4A:
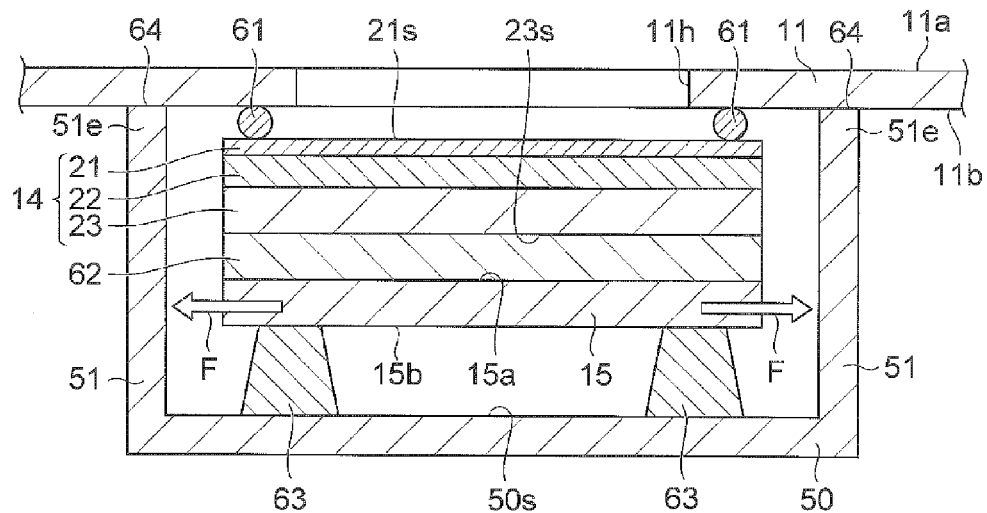
FIG. 4A is a schematic cross-sectional view illustrating an operation and effect of an optical unit illustrated in FIG. 1.

A deformation amount of the connection portion 62 against the predetermined stress is larger than a deformation amount of the driving substrate 23 against the predetermined stress. That is, the connection portion 62 is more easily deformed than the driving substrate 23. Therefore, when a volume of the temperature controller 15 is changed as illustrated in FIG. 4A, the connection portion 62 follows the change in volume of the temperature controller 15. Also, an area A2 on the temperature controller 15 side of the connection portion 62 is more greatly deformed than an area A1 on the driving substrate 23 side of the connection portion 62. In other words, deformation of the area A1 connected (bonded) to the driving substrate 23 is suppressed. Accordingly, the connection portion 62 buffers stress F caused by the volume change of the temperature controller 15.

The temperature controller 15 is arranged between the signal processing element 14 and the cover 50 and is connected to both the signal processing element 14 and the cover 50. The temperature controller 15 is connected to the signal processing element 14 by the connection portion 62. Connection portions (third connection portions) 63 are arranged between the temperature controller 15 and the bottom surface 50s of the cover 50, and the temperature controller 15 and the bottom surface 50s are connected to each other by the connection portions 63.

The connection portions 63 are arranged in positions on the opposite side of the connection portion 62 with the temperature controller 15 interposed therebetween. More specifically, a plurality of the connection portions 63 are arranged between a rear surface (a surface on the opposite side of the surface 15a) 15b of the temperature controller 15 and the bottom surface 50s of the cover 50. The connection portions 63 are bonded to both the rear surface 15b of the temperature controller 15 and the rear surface 11b of the optical substrate 11 to thereby fix the temperature controller 15 and the cover 50 to each other. The connection portions 63 support the temperature controller 15 (and the signal processing element 14 on the temperature controller 15) on the bottom surface 50s of the cover 50.

Further, the connection portions 63 perform thermal insulation between the temperature controller 15 and the cover 50. The connection portions 63 include, for example, a thermally insulating porous body, such as glass wool, or a thermally insulating gel. When the connection portions 63 are the porous body, the porous body may be impregnated with an adhesive to have an adhesive property. Thermal conductivity of the connection portion 62 is higher than thermal conductivity of the connection portions 63. Therefore, heat from the temperature controller 15 is easily transferred to the signal processing element 14 through the connection portion 62. In other words, it is difficult for the heat from the temperature controller 15 to be transferred to the cover 50 through the connection portions 63.

The cover 50 comes in contact with the rear surface 11b of the optical substrate 11 at a distal portion 51e of a side portion 51. When the cover 50 is a metal, the cover 50 and the optical substrate 11 may be fixed at contact portions CP by welding. The contact portions CP include connection portions (fourth connection portions) 64 which connect the cover 50 to the optical substrate 11.

The cover 50 is connected to the optical substrate 11 by the connection portions 64. The connection portions 64 may be the entire contact portions CP or may be portions of the contact portions CP. When the entire optical unit 10 is sealed by the housing 40, the connection portions 64 need not be airtight. Therefore, the cover 50 and the optical substrate 11 may be bonded using, for example, low-melting-point glass. That is, the connection portions 64 may include low-melting-point glass.

Here, a deformation amount of the connection portion 62 against predetermined stress is larger than a deformation amount of the connection portions 61 against the predetermined stress. Further, the deformation amount of the connection portions 63 against the predetermined stress is larger than a deformation amount of the connection portions 64 against the predetermined stress. Further, the deformation amount of the connection portions 61 against the predetermined stress is larger than the deformation amount of the connection portions 64 against the predetermined stress.

In comparison of the deformation amounts, the predetermined stress may be applied to the respective connection portions and deformation amounts at that time may be compared with each other. For example, a criterion of ease of the deformation can be a Young's modulus when the connection portions 62 and 63 are gels or can be a pore density when the connection portions 62 and 63 are porous bodies. Further, when the connection portions 62 and 63 contain the porous body and the adhesive with which the porous body is impregnated, the Young's modulus thereof may be the criterion.

As described above, the optical unit 10 includes the temperature controller 15 arranged opposite the driving substrate 23 of the signal processing element 14. Therefore, using the temperature controller 15, the temperature of the signal processing element 14 (particularly, the liquid crystal layer 25) may be increased from the driving substrate 23 side and the response speed may be improved.

However, when the temperature of the signal processing element 14 is increased using the temperature controller 15, the temperature controller 15 is expanded and a volume of the temperature controller 15 is changed. As a result, stress F is generated, for example, in a direction along the main surface 11a and the rear surface 11b of the optical substrate 11, as illustrated in FIG. 4A. The signal processing element 14 may be deformed and damaged due to the stress F. Further, the stress F may be transferred to the optical substrate 11 and the optical substrate 11 may be deformed.

Figure 4B:
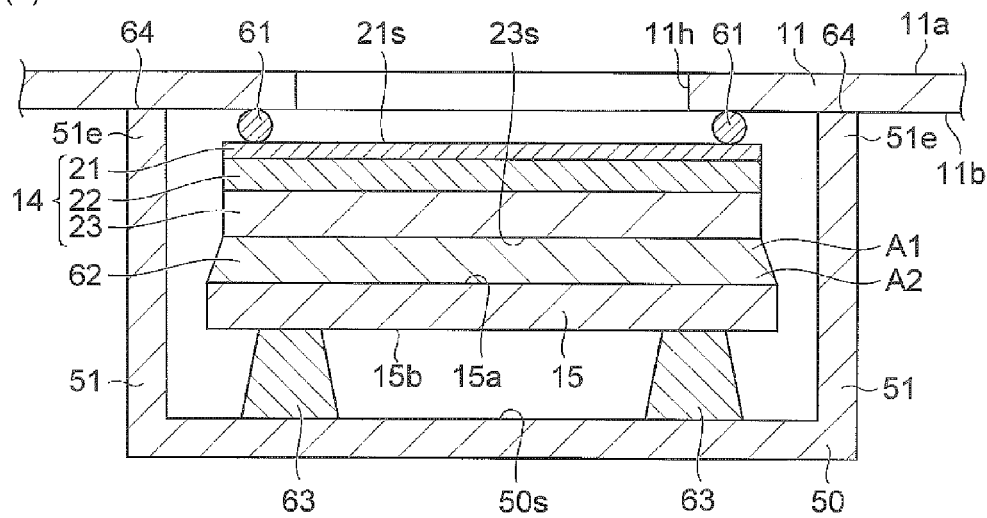
FIG. 4B is a schematic cross-sectional view illustrating an operation and effect of the optical unit illustrated in FIG. 1.

However, the connection portion 62 is configured such that the area A2 on the temperature controller 15 side of the connection portion 62 is more greatly deformed than the area A1 on the driving substrate 23 side of the connection portion 62 according to change in a volume of the temperature controller 15 in order to buffer the stress F (see FIG. 4B). Therefore, the deformation of the signal processing element 14 and the optical substrate 11 are suppressed. Thus, according to this optical unit 10, deterioration of the optical characteristics in improving the response speed is suppressed.

Here, when the connection portion 62 is configured to be less easily deformed than the connection portions 61, the stress F caused by the volume change of the temperature controller 15 may be buffered by deformation of the connection portions 61. In this case, the optical characteristics deteriorate as a result of change in a positional relationship between the optical substrate 11 (that is, the input/output unit 12 or the optical system 13) and the signal processing element 14 with the deformation of the connection portions 61. On the other hand, in the optical unit 10, since the connection portion 62 is more easily deformed than the connection portions 61, the stress F is reliably buffered by the deformation of the connection portion 62.

Further, on the opposite side of the connection portion 62 (that is, the signal processing element 14), the temperature controller 15 is connected to the cover 50 by the connection portions 63. Therefore, the stress F caused by the volume change of the temperature controller 15 can be absorbed on the opposite side of the signal processing element 14 as well.

In this case, if the connection portions 63 are configured to be less easily deformed than the connection portions 64, the stress F may be buffered by deformation of the connection portions 64. In this case, the stress F is transferred to the optical substrate 11 through the connection portions 64. On the other hand, in the optical unit 10, since the connection portions 63 are more easily deformed than the connection portions 64, the stress F is reliably buffered by the deformation of the connection portions 63.

Further, in the optical unit 10, since thermal conductivity of the connection portion 62 is higher than that of the connection portions 63, heat generated from the temperature controller 15 is relatively easily transferred to the connection portion 62. Therefore, the transfer of the heat generated by the temperature controller 15 to the cover 50 through the connection portions 63 is suppressed. Therefore, deformation of the cover 50 caused by the heat from the temperature controller 15 and deformation of the optical substrate 11 with the deformation of the cover 50 are suppressed.

Further, the signal processing element 14 is connected to the optical substrate 11 at the cover glass 21. On the other hand, the signal processing element 14 is supported by the cover 50 from the driving substrate 23 side through the connection portion 62, the temperature controller 15, and the connection portions 63. Also, the cover 50 can be firmly fixed to the optical substrate 11 by welding. In other words, it is possible to reliably support the signal processing element 14 using the cover 50 (and the connection portions 64) while suppressing damage of the cover glass 21 by causing the connection portions 61 to be more easily deformed than the connection portions 64.

Further, the input/output unit 12 and the optical system 13 are mounted on the main surface 11a of the optical substrate 11, and the signal processing element 14 that is a temperature control target is mounted on the rear surface 11b of the optical substrate 11. Therefore, the temperature controller 15 is easily arranged without interrupting the optical path.

Further, the linear expansion coefficient of the optical substrate 11 is $1 \times 10^{-6}$/deg ° C. or less. Therefore, a difference between the linear expansion coefficient of the optical substrate 11 and the linear expansion coefficient of the temperature controller 15 is greater. Therefore, it is more effective to suppress the deformation of the optical substrate 11 by the stress F caused by the volume change of the temperature controller 15.

Further, since the optical system 13 includes a plurality of optical components, such as the anamorphic system 17, the wavelength dispersive element 18, and the condensing element 19, an optical path is long. Therefore, since deterioration of the optical characteristics caused by deformation of the optical substrate 11 is remarkable, it is particularly effective to suppress the deformation of the optical substrate 11, as described above.

Further, the optical unit and the optical device according to one aspect of the present invention are not limited to the optical unit 10 and the optical device 100 described above. The optical unit and the optical device according to one aspect of the present invention can be arbitrary modifications of the optical unit 10 and the optical device 100 without departing from the gist of each claim.

Figure 5:
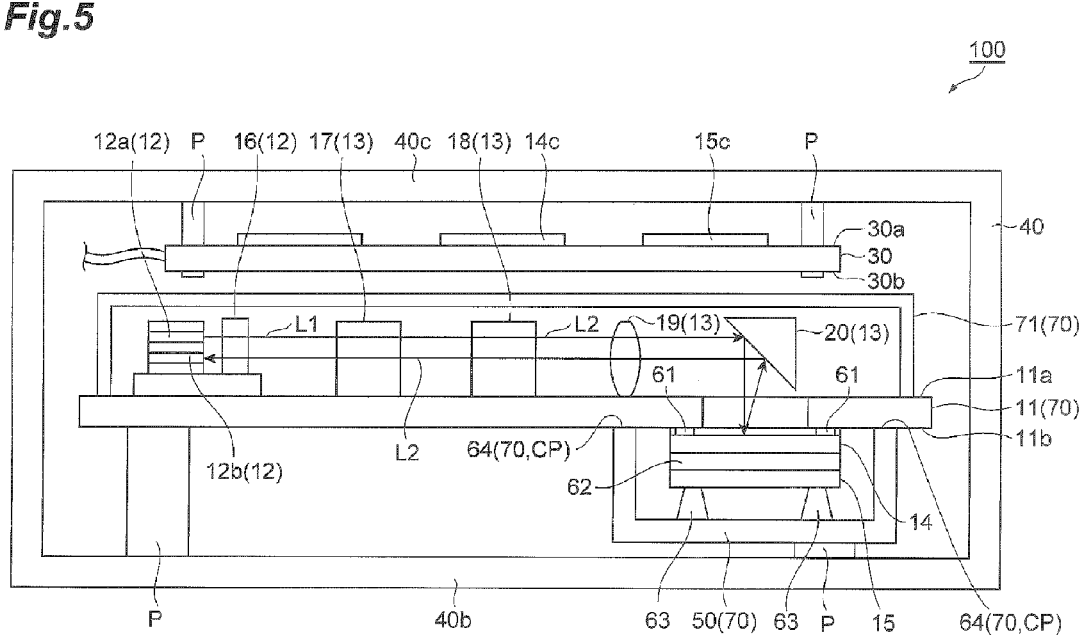
FIG. 5 is a schematic cross-sectional view illustrating a modification example of the optical device illustrated in FIG. 1.

For example, the optical unit 10 may further include a housing (a first housing) 70, as illustrated in FIG. 5. The housing 70 includes the optical substrate 11, a cover 71 provided on the main surface 11a of the optical substrate 11, the cover 50 provided on the rear surface 11b of the optical substrate 11, and the connection portions 64. The housing 70 seals the input/output unit 12, the optical system 13, the signal processing element 14, and the temperature controller 15. That is, the cover 50 and the connection portions 64 constitute a portion of the housing 70.

In this case, a distal portion 51e of the cover 50 comes in contact with the rear surface 11b of the optical substrate 11 to constitute contact portions CP. Also, it is necessary to connect the cover 50 with the optical substrate 11 over the entire contact portions CP to constitute the connection portions 64. On the other hand, when the optical unit 10 includes the housing 70, it is not necessary to seal the entire inside of the housing 40. Therefore, handling of, for example, the electrical substrate 30 is facilitated. Further, optical device 100 may be downsized since the cover 50 is used as a portion of the housing 70.

Further, when the optical substrate 11 is not in a flat plate shape (for example, is in a plate shape having an L-shaped cross-section), the input/output unit 12, the optical system 13, and the signal processing element 14 are mounted on a first surface of the optical substrate 11 and a second surface different from the first surface of the optical substrate 11 (a surface other than a surface on the opposite side of the first surface) in a distributed manner. Further, the input/output unit 12, the optical system 13, and the signal processing element 14 may be mounted on the same surface of the optical substrate 11.

Further, the signal processing element 14 may have one or a combination of a plurality of functions such as light intensity modulation, phase modulation, and spatial modulation (deflection). The signal processing element 14 may include a liquid crystal layer or an electro-optic crystal as the modulation layer (a light deflection layer).

What is claimed is:

1. An optical unit comprising:
an input/output unit;
a signal processing element modulating a beam input from the input/output unit;
an optical system optically coupling the input/output unit and the signal processing element;
an optical substrate mounting the input/output unit, the optical system, and the signal processing element; and
a temperature controller controlling a temperature of the signal processing element,
wherein the signal processing element includes an incidence surface on which the beam input from the input/output unit is incident, a modulation layer modulating the beam incident from the incidence surface, and a driving substrate for controlling the modulation of the beam arranged on the opposite side of the incidence surface in the modulation layer,
the temperature controller is arranged opposite the driving substrate,
the incidence surface is connected to the optical substrate by a first connection portion,
the driving substrate is connected to the temperature controller by a second connection portion, and
the second connection portion thermally connects the driving substrate and the temperature controller so that an area on the temperature controller side of the second connection portion to be more greatly deformed than an area on the driving substrate side of the second connection portion according to change in volume of the temperature controller.

2. The optical unit according to claim 1,
wherein a deformation amount of the second connection portion against predetermined stress is larger than a deformation amount of the first connection portion against the predetermined stress.

3. The optical unit according to claim 1, further comprising:
a cover covering the signal processing element and the temperature controller,
wherein the temperature controller is connected to the cover by a third connection portion,
the cover is connected to the optical substrate by a fourth connection portion, and
the third connection portion is arranged opposite the side the second connection portion is provided in the temperature controller.

4. The optical unit according to claim 3,
wherein thermal conductivity of the second connection portion is higher than thermal conductivity of the third connection portion.

5. The optical unit according to claim 3,
wherein a deformation amount of the third connection portion against the predetermined stress is larger than a deformation amount of the fourth connection portion against the predetermined stress.

6. The optical unit according to claim 3,
wherein a deformation amount of the first connection portion against the predetermined stress is larger than a deformation amount of the fourth connection portion against the predetermined stress.

7. The optical unit according to claim 1,
wherein the input/output unit and the optical system are mounted on a first surface of the optical substrate, and
the signal processing element is mounted on a second surface different from the first surface of the optical substrate.

8. The optical unit according to claim 7,
wherein a hole opening in the second surface is formed in the optical substrate, and
the signal processing element is arranged to face the hole and optically coupled to the input/output unit via the optical system and the hole.

9. The optical unit according to claim 3, further comprising:
a first housing sealing the input/output unit, the optical system, and the signal processing element,
wherein the cover and the fourth connection portion constitute a portion of the first housing.

10. The optical unit according to claim 1,
wherein a linear expansion coefficient of the optical substrate is $1\times10^{-6}$/deg ° C. or less.

11. The optical unit according to claim 1,
wherein the optical system includes
an anamorphic system converting a shape of the beam input from the input/output unit into an elliptical shape;
a wavelength dispersive element dispersing the beam into wavelength components; and
a condensing element coupling the wavelength components to the signal processing element.

12. An optical device comprising:
the optical unit according to claim 1;
an electrical substrate including a first control system controlling the signal processing element and a second control system controlling the temperature controller; and
a second housing accommodating the optical unit and the electrical substrate.

* * * * *